Nov. 5, 1940.  G. W. DE BELL  2,220,479

CONTROL VALVE

Filed Aug. 6, 1938  4 Sheets-Sheet 1

INVENTOR
George W. De Bell
BY
Frank H. Borden
ATTORNEY

Nov. 5, 1940.                G. W. DE BELL                2,220,479
                             CONTROL VALVE
          Filed Aug. 6, 1938                    4 Sheets-Sheet 4

INVENTOR
George W. De Bell
BY
Frank H. Borden
ATTORNEY

Patented Nov. 5, 1940

2,220,479

UNITED STATES PATENT OFFICE 2,220,479

CONTROL VALVE

George W. De Bell, Merchantville, N. J., assignor, by mesne assignments, to Reconstruction Finance Corporation Application August 6, 1938, Serial No. 223,522

8 Claims. (Cl. 277—50)

This invention relates to control valves.

In application #190,716, of de Ganahl, having the same assignee as this application, there was disclosed a control valve representing a distinct advance in the art, and upon which, in many regards, this constitutes an improvement. In said application the control valve was connected with a plurality of hydraulic motors or agencies in position to selectively but alternately actuate or energize a given one by placing it in communication with a source of hydraulic pressure or power. The de Ganahl control valve is highly effective and of greater simplicity and ease of operation than anything known in the prior art. As developed hitherto however, it was subject to one major criticism in its application to use with aircraft, for instance, in that owing to the fact that all units of the valve were in series, but one of the hydraulic motors or agencies could be actuated at one time. Obviously in certain emergency and other conditions in aircraft and analogous uses, it would be desirable to be able to effect the simultaneous actuation of a plurality of agencies.

It is among the objects of this invention: to provide a multiple control valve by which selectively, by a single manual manipulation, a desired device can be energized to a maximum hydraulic pressure without additional manipulations or attention by the operator; to provide a hydraulic system in which a low pressure hydraulic circuit is rendered available for the rapid energization and build-up of suitable high pressure in a selected mechanism or in a plurality of mechanisms simultaneously, without further or continuing attention from the operator; to provide a single control means by which a desired mechanism is energized until the pressure actuates a signal, pursuant to which the operator at his convenience may operate the single control to simultaneously lock the actuated device while permitting the circuit to return to low pressure circulation; to improve the art of valves; to provide a control valve with multiple control elements each of which is so disposed in a common circuit as to be free from sticking or jamming because of pressure conditions on the elements; to provide a multiple control valve of extreme simplicity and lightness of weight with high efficiency for aircraft and the like, by which one or a plurality of hydraulic motors may be selectively, alternately or simultaneously actuated; to provide an improved hydraulic system and one of improved functioning for general purposes; to provide a control valve system in which a plurality of control units are arranged in series for low-pressure circulation of a power stream and arranged for disposition in parallel for high pressure circulation of the power stream; to provide a plurality of valve units arranged for operative relative association to accord with the variations in number of hydraulic motor devices or agencies to be coupled to the assembled control device; to provide a control valve in which the valve units are balanced in pressure and reaction to prevent binding; and many other objects and advantages will become more apparent as the description proceeds.

In the accompanying drawings forming part of this description:

Fig. 7 represents a similar section on line 7—7 of Fig. 4 showing the first pressure level.

Fig. 8 represents a similar section taken on line 8—8 of Fig. 4 showing the ultimate or upper pressure level and the intake and exhaust ports of the associated agencies in position to be coupled with the respective valve passages upon suitable oscillation of the valve plugs.

Fig. 8—A represents a section similar to that of Fig. 8, with both valves or valve plugs turned in relatively opposite directions.

Figure 1:
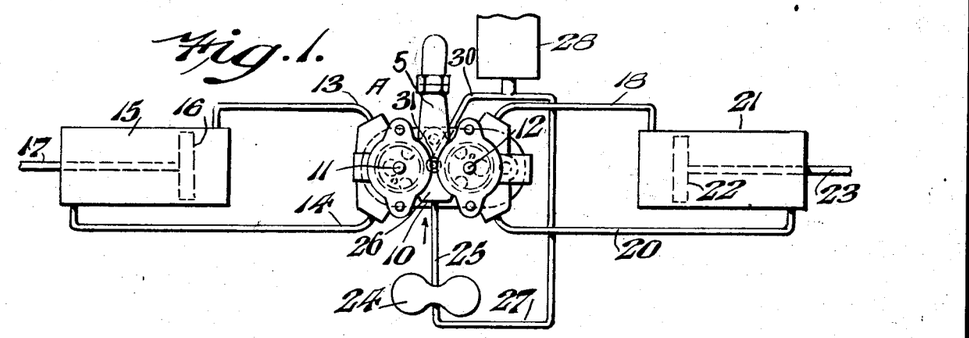
Fig. 1 represents a diagram of the complete hydraulic system according to the simplest two unit form of the invention.
Figure 14:
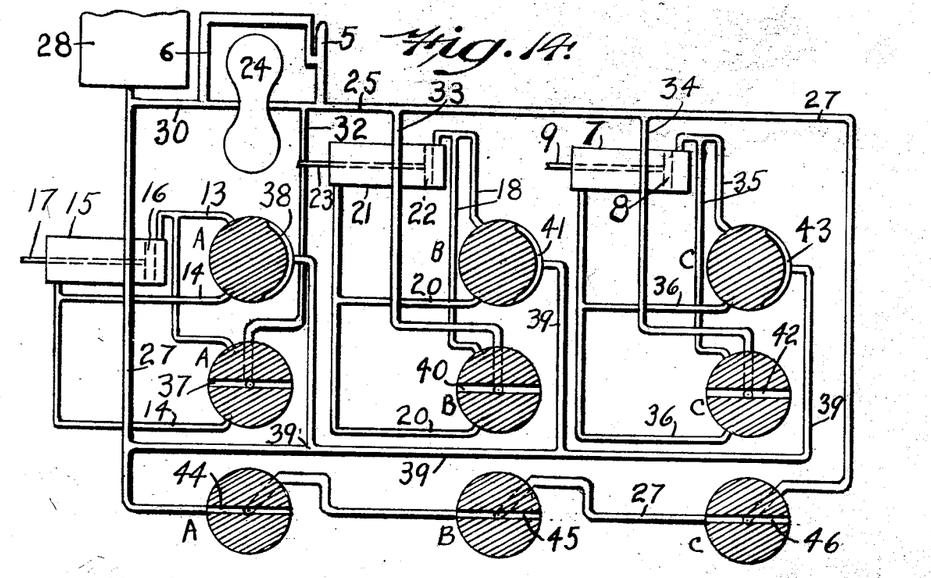
Fig. 14 represents a schematic diagram in substantial projection of the system under free flow low pressure conditions with all units closed relative to their coupled operated agencies, and with such agencies hydraulically locked.
Figure 15:
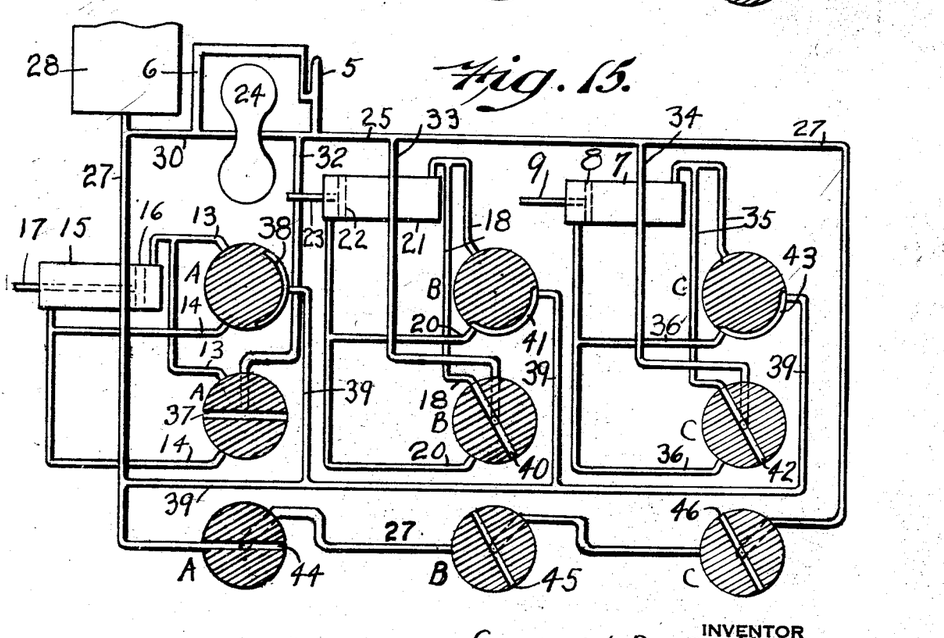
Fig. 15 represents a similar schematic diagram of the system under high pressure conditions incident to actuation of two valve units shutting off the free flow series circuit.

The theory underlying the invention can perhaps best be understood by reference to the purely schematic or diagrammatic three unit disclosures of Figs. 14 and 15 in the light of the two unit multiple valve of Fig. 1. While the diagrams do not exactly portray the actual preferred operation of the valves, as will be pointed out, they will serve to illustrate an exemplification of the principle of a series circulation of low pressure fluid when the valves are closed, and of high pressure parallel relations of the valves and the circuit when one or more of the valves has been actuated and in which pressure on the valves is always balanced and even. Referring, for just a moment, to Fig. 1, a two unit assembly 10 is disclosed having an actuating valve shank 11 on one side and an actuating valve shank 12 on the other upon which suitable handles (not shown) are to be mounted. The valve actuated by shank 11 controls lines 13 and 14 running to a cylinder 15 containing a piston 16 to actuate the rod 17 connected therewith. The rod 17 is coupled to and actuates a desired mechanism, such, for instance as a retractible landing gear (not shown). The valve actuated by the shank 12, controls passages 18 and 20 running to a cylinder 21 or the like containing piston 22 engaging rod 23 in turn coupled to a desired mechanism such as a wing flap, for instance (not shown). A source of hydraulic power such as a gear pump or the like 24 having a delivery line 25 entering boss 26 of the multiple control valve 10 has an intake line 27 leading to a reservoir 28 with a line 30 extending between the reservoir and the exhaust boss 31, extending perpendicularly out of the bottom of the housing 10, to complete the circuit. As shown in Figs. 14 and 15 a relief valve 5 is mounted in a by-passing line 6 leading from line 25 through line 30 around pump 24 to line 27. This circuit is common to all forms of the multiple valve preferably, according to the best embodiment of the invention regardless of the number of valve units.

While the purely illustrative disclosure of Fig. 1 is of the simplest nature comprising but two units, it is a feature of the invention that the number of units may vary in accordance with requirements without limit upon the number of units that may be assembled in one entity. Thus, again purely illustratively the disclosures of Figs. 14 and 15 include three valve units, and as will be explained the valve units disclosed in Figs. 9 to 13 inclusive, may be operatively associated in a great number of units as will be described.

Referring to the schematic disclosures of Figs. 14 and 15, the oscillatory valves A, B and C are provided, of which for instance valves A and B might be those actuated by valve shanks 11 and 12 respectively in Fig. 1. The intake connector 25 leading from the output side of the pump 24 has the connecting intake channels respectively 32, 33 and 34 normally closed by the respective valves A, B and C. The housing surrounding the valves has divergent ports respectively 13 and 14 for valve A, 18 and 20 for valve B and 35 and 36 for valve C. A third hydraulic motor comprising a cylinder 7, piston 8 and connection 9 for operation by unit or valve C is provided. The ports are in communication with the respective agencies or motors to be controlled respectively on opposite sides of the piston thereof and are normally closed by the respective valves. Valve A includes a transverse diametric passage 37 always in communication with channel 32 axially between its ends and arranged to place intake channel 32 in direct communication with either port 13 or 14 in accordance with the direction in which the valve is swung. The valve A also has a drain outlet 38 arranged to register with the opposite port 13 or 14 from that in communication with the channel 37 when the valve is swung and being always in communication with the vent channel 39 leading into return conduit 27. Valve B has a similar diametric channel 40 into which the intake passage 33 leads between the ends of the diametric channel, and the valve unit is arranged to couple the communicating intake passage 33 with a selected port 18 or 20, and illustratively in Fig. 15 it has been so swung as to communicate with the outlet port 18. Simultaneously its drain channel 41 has been placed in communication with the port 20 so as to vent the fluid from the actuated agency into the conduit 39 leading to return 27. Valve C has a similar diametric passage 42 into the medium portion of which the power line 34 leads. Valve C also has a drain outlet 43 and in Fig. 15 is shown as having been given a clockwise rotation to place channel 42 in communication with port 35 leading to one side of piston 8 in cylinder 7, while the other port 36 has been placed in communication with the drainage outlet 43 leading to return conduits 39 and 27.

The valves A, B and C respectively have also transverse free flow passages 44, 45 and 46 in series alignment with the return circulating channel 27, each leading to median points of the passages, so that when the valves A, B and C are in neutral position, that is, so turned as to close the respective diametric channels, 32, 33 and 34, by having opposite ends of the channels in juxtaposed relation to the valve chambers, a continuous low pressure free flow circulation from the pump 24 through the valve assembly and return, in series through each of the valve units of the multiple valve, is provided. It is worthy of note that at this time also each of the hydraulic agencies 16, 22 and 8 are hydraulically locked by the closing of both of their ports by the respective valves.

Assuming that any valves are turned, as valves B and C in Fig. 15 as shown, the low pressure or free flow circulation is immediately terminated by the fact that channel or duct 46, as well, of course, as duct 45, is moved out of registration with the channel 27, while simultaneously intake channels 40 and 42 of valves B and C respectively are coupled with the respective hydraulic motor connectors 18 and 35 so that the continuation of the pumping by pump 24 leads fluid through short connections 33 and 34 through the valves and behind pistons 22 and 8, and builds up high pressure in the entire system up to valve A, in the short connector 32, of line 25, and up to valve C in the return line 27. If at this juncture valve A was to be actuated the high pressure fluid would be available upon the hydraulic agency 16 which it controls. Obviously the change from low pressure and free flow to high pressure occurs when two or more of the valves are actuated simultaneously, as well as upon the actuation of a single valve.

One major difference of this invention from the prior art lies in the fact that the pressure in short lines 32, 33 and 34, as well as in the return line 27, by the closing is stopped internally of the valve itself, by balanced pressure in both directions diametrically against the valve housing, instead of by interposing the valve body or plug itself across the opening. The latter procedure might with high pressures exert such a lateral unbalanced pressure upon the valve body itself as to cause it to bind therein to a degree rendering the operation of the valves difficult and even impossible, as well as increasing the wear and hastening the development of leaks if the valves are actuated during periods of lateral unbalanced pressures. The construction according to this invention is such that the actuation of a valve to stop the fluid flow always causes the pressure to terminate within the valve itself in an open diametric duct, so that the pressure on the valve body can be evenly balanced to prevent binding, as the action and reaction on the valve in its housing are always equal, opposite and cancelling.

Referring to Figs. 1, 2, 3 and 4 for a disclosure of the preferred embodiment of the actual multiple valve itself in its simplest two unit form, the housing 10 is suitably drilled and plugged as to form a longitudinal primary valve chamber or aperture 50, having the liner 51 held in place at the rear end by the rear hollow threaded ring 52, having a central axial aperture 53. At the front end the liner 51 is held in place by the threaded plug 54 having a packing gland 55 through which the shank 11 of the valve or valve plug to be described may extend. The housing 10 has a boss 26 (Fig. 3) through which the passage 56, extends, in communication with an intersecting passage 57, leading to the valve units, with the boss 26 in communication with intake 25 from the pump 24. The transverse bore 57 (Fig. 2) is arranged for both free flow and pressure flow as well and leads the incoming hydraulic fluid to the valve chamber 50 through a port 58, and through a port 62 into a spaced parallel longitudinal secondary valve chamber 60 having a liner 61. In spaced parallel relation to passage or bore 57 there is provided the transverse channel or bore 63 arranged for free flow only, having terminal ports 64 and 65 in the respective valve chambers. The secondary valve chamber liner 61 is held in place by the hollow substantially cylindrical threaded plug 66 at the rear end, and by the frontal threaded plug 67, having the packing gland 68 for the valve shank 12. In the two unit device shown in Fig. 2, the housing is further provided with the frontal short transverse bore 70 having the port 71 and the elongated passage 72 parallel to the valve chambers 50 and 60.

The rear of the assembly and housing is closed and sealed by the internally webbed or footed end plate 73 carrying the external boss 31 and defining an internal common transverse passage 74 communicating simultaneously with the axial apertures in the threaded plugs 52 and 66, and about a supporting foot, with the return passage 72. This corresponds to return line 39 of Fig. 14. The boss 31 has an internal aperture 75 communicating with the passage 74 and with the conduit 30 leading to the pump.

The valve housing has a relief valve 5 comprising a relief valve seat 76 (Fig. 3) in the passage 56 on the other side of the intersecting transverse intake 57, beyond which seat the transverse intersecting bore 77 is formed, corresponding to channel 6, (Fig. 14), leading to the common passage 74 and the opening 75 in the boss 31. The relief valve seat 76 is normally sealed by the ball 78 engaged by the piston 80 variably spring-pressed by the compression spring 81 and the threaded adjustable housing 82. The relief valve is normally locked by the lock nut housing 83, at a predetermined pressure, so as to permit unseating of the valve when the pressure in the system reaches a predetermined point. Usually and preferably the relief valve is so arranged as to vibrate or otherwise audibly or visibly to indicate that the relief pressure has been attained. Obviously upon attainment of relief high pressure in the system, the fluid passing about the ball and through channel 77 passes through boss 31 to the line 30 of the pump system.

Figures 2, 3:
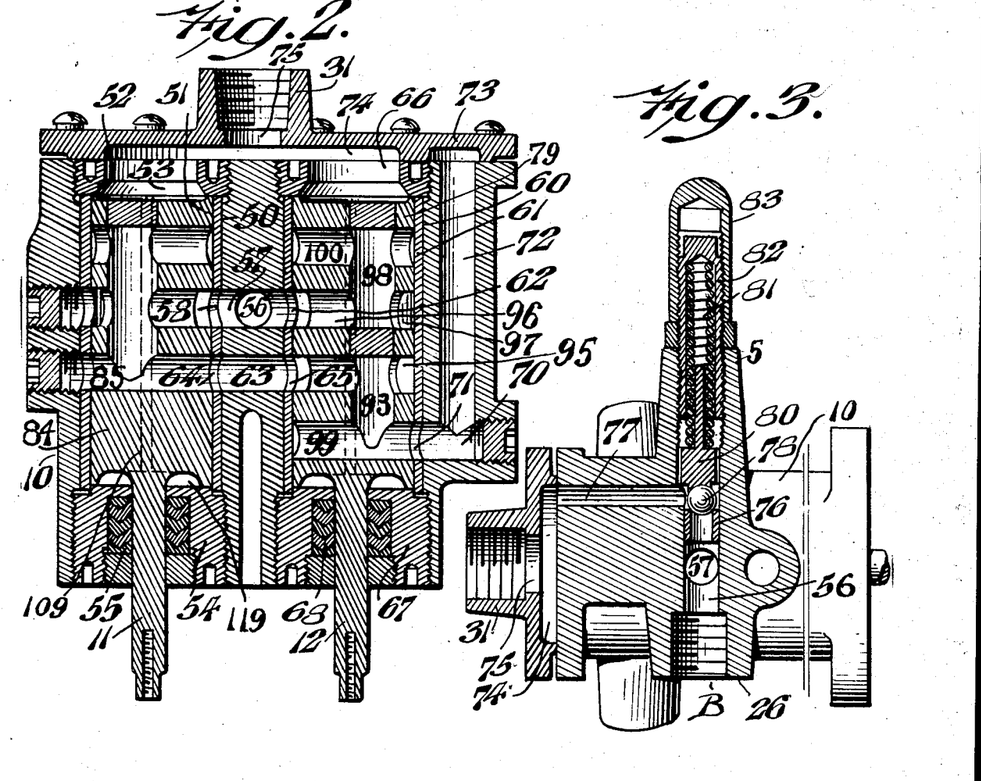
Fig. 2 represents a vertical transverse section through the simple two unit valve assembly of Fig. 1 showing both control valve units.
Fig 3 represents a section partially in elevation of the relief valve and return circuit conduit of the invention.

All of the valve units or valve plugs used with this system are of the same size and as shown in dotted lines in Fig. 2 are each provided with a through axial bore 109 leading from a frontal recess 119 longitudinally of the valve, body or plug to the rear face thereof, to communication with common passage 74 so as to drain any fluid that may reach the front of the valve to the return line without leakage. As diagrammatically illustrated in Figs. 4 to 13 inclusive the valve or valve plugs or units except the first in the series are comprised of four longitudinally spaced diametrical levels or stages, for the purpose of providing transverse ports or passages connected in pairs by longitudinal passages. This enables the introduction of fluid pressure into an intermediate portion of one through diametric channel from an adjacent through diametric intake channel so as to create balanced pressure relative to the valve. It may be stated that the four stages are divided by a central transverse partition and that the frontal or forward two levels on one side of the partition are concerned with the free flow circulation while the rearmost or outer two levels on the other side of the partition are concerned with the pressure flows within the system.

The left hand or primary valve or valve body 84 (Figs. 2, 4 and 9), having the actuating shank 11, is an exception to the rule respecting four levels of transverse bores, inasmuch as the foremost actual bore is omitted, although the level therefor may be provided. The valve 84 has a transverse channel or passage 85 extending substantially diametrically of the cylindrical valve on the free flow side of the middle thereof. On the pressure flow side of the middle of the valve 84 there is provided the forward pressure channel 86 communicating at both ends with a continuous peripheral channel 89, always in communication in all adjusted positions of the valve 84 with the port 58 of the channel 57 leading from the intake passage 56. The forward pressure channel 86 is in communication with the rearward (or only) free flow channel 85, (in valve 84 only) by means of an axial connecting passage 87, and with the rearmost pressure channel 88 by a similar axial connecting channel 90.

Figures 7, 8, 8A:
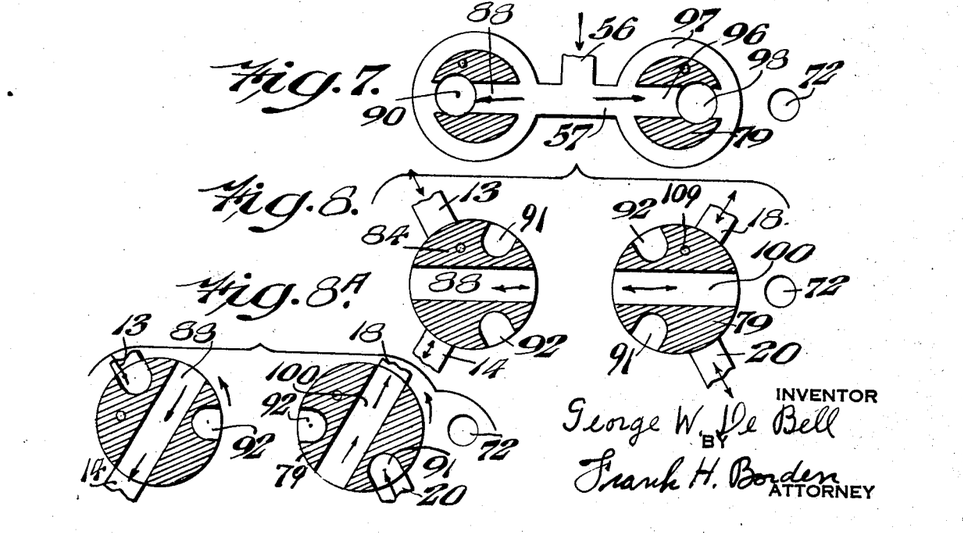

Both valve 84 and valve 79 to be described have a pair of axially and radially extending relief or recessed ports respectively 91 and 92, extending from the rear end face to the rearmost diametric channel level to communicate with the respective channels connected to the hydraulic agencies, lying in said diametrical level as shown in Figs. 8 and 8—A. Respectively and illustratively in the case of valve 84 the channel 88 and recessed ports 91 and 92 selectively engage with connectors 13 and 14. Said ports 91 and 92 are represented on Figs. 14 and 15 as drainage channels 38, 41 and 43 of valve units A, B and C respectively.

Considering the secondary valve of the two-unit series as comprising the valve 79 (Fig. 4) the foremost low pressure channel 99 communicates through the longitudinal channel 93 with the rearmost low pressure free flow fluid channel 94, the ends of which register with a continuous peripheral channel 95, as will be understood. There being no communication between the free flow end of the valve 79 and the pressure flow end except through the channels in the valves and bores 57 and 63 in the housing, the foremost pressure channel 96 is separated by a solid web or partition from channel 94, and like passage 86 in valve 84, is shorter than the diameter of the valve as it terminates in the continuous peripheral groove 97, and communicates through the short axial or longitudinal connecting passage 98 with the rearmost pressure channel 100. It is preferred that each of the several transverse channels or passages extend diametrically through the valve. Although given different numbers for ease in explanation, it will be observed that the high pressure passages, both diametric and axial, and the communicating peripheral grooves are similar and similarly located in both valves 84 and 79.

Figure 4:
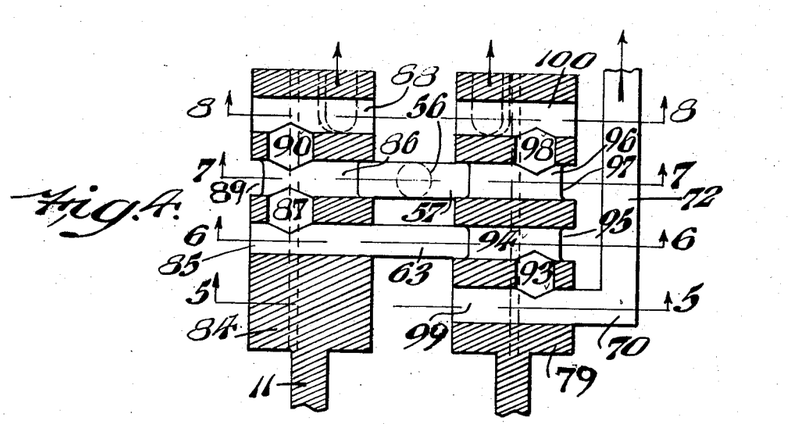
Fig. 4 represents a diagrammatic section through the two valves of Fig. 2 to illustrate the several bores and passages of the end units to show the relation of the circulation passages.
Figure 5:
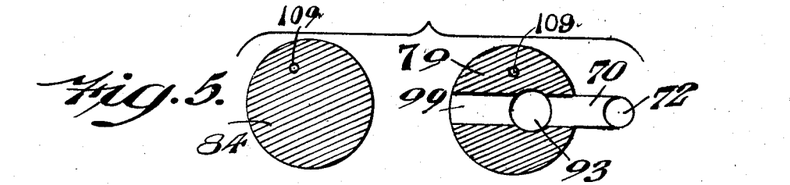
Fig. 5 represents a section through the diagram of Fig. 4, on line 5—5 thereof, showing the return free flow circulation level.
Figure 6:
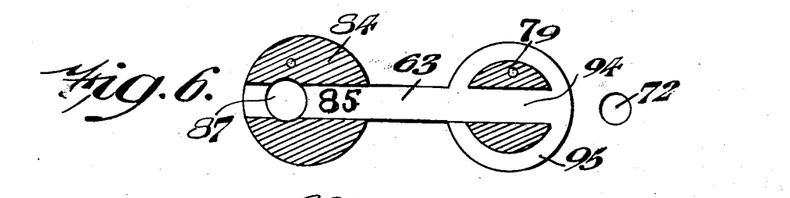
Fig. 6 represents a similar section taken on line 6—6 of Fig. 4 showing the other free flow level above the return.

With the valves disposed as disclosed in Figs. 2 and 4, it will be understood that the freely flowing substantially pressureless fluid entering through aperture 56 in the valve housing, passes laterally in one direction only through the channel 57, toward valve 84 being blocked from actual movement in valve 79, as, after passing into the peripheral channel 97 of the latter and through transverse channel 96 and axial connecting channel 98 into transverse bore 100, it impinges against closed surfaces of the valve liner 61 at each end of the diametric bore or duct 100 so that merely static pressure is in existence thereon so long as free flow exists through the rest of the system. In the other direction toward valve 84 the free flow through conduit 57 enters the peripheral groove 89 in the valve 84 and into the transverse pressure channel 86. From the latter the free flow may not pass upwardly through channel 90 into the bore 88 because each end of bore 88 is closed by the liner 51 and the entrapped fluid is purely static and has no pressure head. However it can pass forwardly (longitudinally of the valve) through channel 87 into the free flow channel 85, then laterally through port 64, channel 63 and port 65 in the valve housing, into the peripheral groove 95 of the valve 91, from which it passes laterally through channel 94, then axially through the channel 93, into the transverse bore 99, then laterally again through port 71, into the channel 70, into the return free flow channel 72 which is permanently in communication with common exhaust passage 74. As the latter leads directly back to the pump the free flow circuit will be complete.

Assuming that valve 84 is turned in a counter clockwise direction it will be observed that the free flow will be cut off because of the misalignment of the free flow channel 85 relative to the stationary free flow channel 63, so that as the pump functions the pressure begins to build up in the system comprised of the rear half of valve 79 and all of valve 84, but this is ineffective toward causing binding of valve 84 because of the substantially diametrical extent of the channel 85, which, because of valve rotation is now closed at both ends by the housing or liner inner surface, whereby the action and reaction relative to the walls of the liner 51 are equal, opposite and cancelling. At the same time the channel 88 of valve 84 has been placed in communication with the motor agency connector 14, while the vent port 91 has been placed in communication with the return connector 13. Obviously with such connection and set-up the actuation of the coupled agency 17 will be promptly initiated and will be continued and the pressure will continue to build up until the maximum pressure for which the relief valve has been set will have been attained, during which the hydraulic motor 17 will have been actuated to the end of its cycle or stroke. Presumably this peak of pressure requiring relief is not reached until after the agency has been actuated to the predetermined degree. If the valve 84 remains in motor coupled relation during this period and after the motor cycle is complete the fluid continues a circulation through the pump and the system by passing through the relief valve through line 6 of Figs. 14 and 15, and line 77 of Fig. 3 as will be clear.

Assuming valve 84 to remain in neutral as disclosed in Fig. 4 and the related figures and valve 79 to be swung in a counter-clockwise direction which latter is indicated in the right hand portion of Fig. 8—A, such oscillation will cause misalignment of the free flow channel 99 relative to the return channel 70, and the effective sealing of both ends of the channel 99 by the solid wall of the liner 61, which causes equal and opposite pressure at both ends of the channel 99 on opposite sides of the cylinder. As the pressure increases toward high pressure in the entire system comprised of both valves it is balanced in its pressure and reaction so that the valve 79 turns freely. As the channel 100 on the high pressure level has registered with the port 18 while the return recess 91 registers with the channel 20 the building up of pressure in the system actuates the agency coupled to the shaft 23 (Figs. 1 and 14) and simultaneously drains the non-working side into the system through recess 91 and common exhaust chamber or passage 74. Obviously the fact that when valve 79 is turned to cause high pressure duct 100 to register at one end with a solid wall and at the other with a conduit 18, makes no difference in the balance that attaches to the valve. The action at one end is opposed by the reaction of the housing, the action at the ported end is balanced by the fluid reacting pressure at the junction of bore 100 with duct 18.

As shown in Fig. 8—A, both of the valves can be actuated simultaneously and high pressure will be built up simultaneously in both agencies controlled by the units while the vent or drain ports are coupled with the line ultimately returning to the pump.

It is a part of this invention to simplify the valve constructions by the creation of a plurality of units which can be readily assembled in series of any desired numbers so as to control an appropriate selected number of agencies. To accomplish this result with a minimum of parts and with maximum effectiveness is an important principle of this invention and as developed requires five basic combinations of valve plug and housing as shown in Figs. 9 to 13 inclusive. It is of interest to note that all of the high pressure passages and grooves are the same in each plug as in valve 79 and that there are not more than three varieties of free flow passages to take care of any desired number of valve units in a series.

Figures 9, 10, 11:
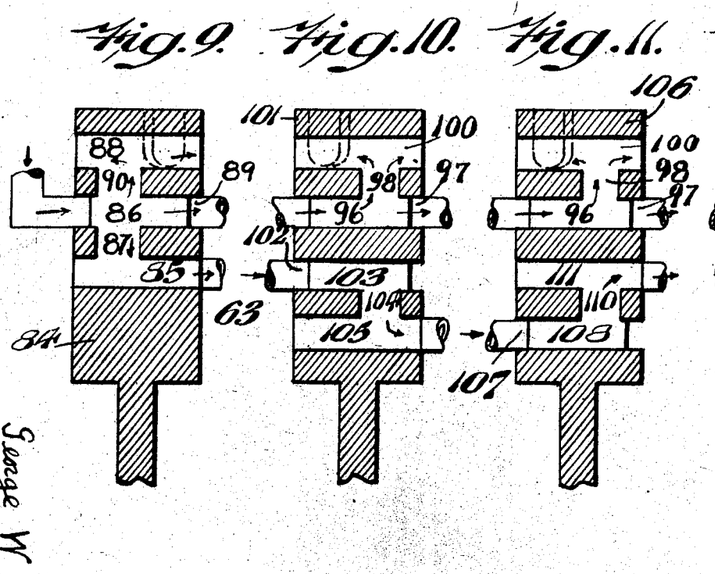
Fig. 9 represents a diagrammatic section through a valve unit or plug to form one end valve of a series of valves of any length.
Fig. 10 represents a similar diagrammatic section through a valve unit or plug to form the even numbered valve units of a series of valve units of any number of units whether it is used as an intermediate unit or as a terminal unit in said series.
Fig. 11 represents a similar diagrammatic section through a valve unit or plug to be placed in series with the valve units of Figs. 9 and 10 when a multiple valve of three or more units is to be used and which forms all odd numbered units after the first shown in Fig. 9.

In Fig. 9, there is disclosed the first valve necessary for any series of units, according to a preferred embodiment of the invention, and it is constructed exactly in accordance with the valve 84 of Fig. 4. This valve is the first end valve of any series. With the first end valve common to all series, there are provided two opposite end combinations of valve plug and housing to be used alternately in accordance with the number in the series. The valve shown in Fig. 12, which is the valve 79 of Fig. 4 is always used when the series of units is even in number as indicated, for instance, in Figs. 2 and 4. The combination of Figs. 9 and 12 as shown in Fig. 4 makes an even numbered series of two units. The intermediate units are shown respectively in Figs. 10 and 11. Fig. 10, which represents the first intermediate unit 101, must be capable of receiving the low pressure free flow fluid on the same level as the channel 85 of valve 84 and fixed bore 83 in the housing, and to that end is provided on the free flow end of the valve at the rearmost stage or level, with the peripheral groove 102, of such intermediate valve unit 101, in communication with the diametric bore 103 thereof. Fluid entering bore 103 from passage 83 passes through axial port 104 into the diametrical transverse channel 105. The valve unit 101 is always the first intermediate valve of a series of three or more. The valve 106 of Fig. 11, comprising the second intermediate unit, in its arrangement of peripheral grooves and ducts and in axial direction of free flow is opposite and complemental to valve unit 101 of Fig. 10, inasmuch as at the foremost level thereof the peripheral channel 107 is provided, in communication with which the bore 108 is diametrically disposed, leading axially through passage 110 into the rearward free flow transverse channel 111, extending diametrically the full width of the valve. Both valves 101 and 106 are used in any combination of four or more units.

To form an alternate end to the series, as when there is any odd number of units, and therefore the valve 79 cannot be used, because the free flow return from an odd number of units, (valve 101) has to enter a frontal level instead of a rearward level of the free flow stage, the valve 112 is provided having the same rearward pressure constructions of all of the other valves, but being provided in the free flow level with a foremost peripheral channel 113, communicating with the short transverse bore 114, leading axially through passage 115, into the full length transverse diametric channel 116. The latter is arranged to register with a second or rearmost free flow level of a fixed transverse bore 117 in the housing leading to the return channel 118. This is obviously alternate to the valve shown in Fig. 12 and applies to any odd number of units.

Figure 12:
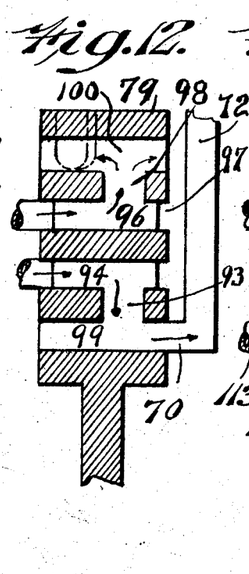
Fig. 12 represents a similar diagrammatic section through a valve unit of the type shown in Fig. 10 when used as a terminal unit of an even numbered series of units.
Figure 13:
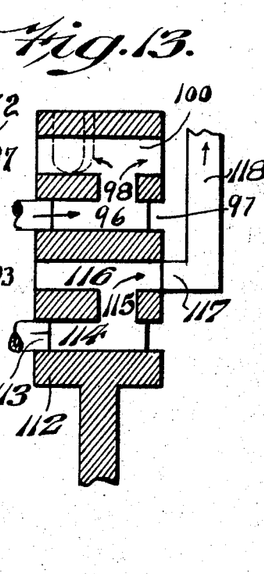
Fig. 13 represents a similar diagrammatic valve section through a valve unit of the type shown in Fig. 11 when used as the terminal unit in an uneven numbered series of units.

A detailed examination of Figs. 9 to 13 inclusive will indicate that the five combinations shown have been accomplished with the use of only three types of valve plugs, as the plugs of Figs. 10 and 12 are identical as are the plugs of Figs. 11 and 13. This further simplifies the manufacture of multiple valves.

With such an assembly of units in stock, it is obviously a simple matter to provide housings and coupling connections, capable of association with other housings so as to comprise the desired built-up units. To indicate the manner in which these valves would be associated, it might be observed that for two units the valves shown in Figs. 9 and 12 would be used. For three units the valves shown in Figs. 9, 10 and 13 are used. For a four unit assembly valves would be associated as shown in Figs. 9, 10, 11 and 12. For five units, the valves would be associated as shown in Figs. 9, 10, 11, 10 and 13. For six units the assembly would comprise an assembly of the disclosures of Figs. 9, 10, 11, 10, 11 and 12, and so on. The intermediate valves as shown in Figs. 10 and 11 would simply continue to be alternated with the appropriate right hand end element or unit selected from the valves of Fig. 12 or 13. The efficiency, economy and extreme desirability of the invention disclosed will be appreciated.

I claim:

1. A multiple control valve comprising a housing having two valve chambers, said housing having a pair of spaced transverse conduits establishing communication between the chambers, a valve oscillatable in one chamber and having three transverse diametric channels the respectives axes of which lie in planes in substantially parallel spaced relation perpendicular to the axis of the valve, said valve having a peripheral groove communicating with one of said channels and being continuously in registration with one of the transverse conduits, the housing have a port communicating with an agency to be actuated having an axis lying in the plane containing another of said transverse channels of said valve so as to be capable of alignment and misalignment therewith as the valve is oscillated, the remaining channel in said valve being susceptible to alignment and misalignment with said other conduit in said housing, all of said channels in said valve being in communication, a second valve having four transverse channels the axes of which lie in parallel spaced planes each perpendicular to the axis of said second valve, the channels of the second valve being arranged in communicating pairs each out of communication with the other pair and one of each pair of channels being always in communication with peripheral grooves formed on the second valve in alignment with said respective conduits, said housing have a port leading to a secondary agency with which one of said channels of the secondary valve is arranged for alignment and misalignment while its companion channel of the pair maintains communication with said conduit leading to the said first mentioned valve, said housing having a free flow channel with which another transverse channel of the second valve is arranged for alignment and misalignment while its companion channel of the pair still maintains communication with the other of said conduits in the housing.

2. A valve unit for a multiple valve comprising a cylindrical plug having a plurality of substantially diametric transverse channels having axes lying respectively in longitudinally spaced diametric planes perpendicular to the axis of the cylinder, said channels being arranged in pairs respectively of pressure channels and free flow channels located respectively at each end of the valve and having longitudinal communicating passages between the channels of each pair, said cylinder having a pair of peripheral grooves communicating respectively with one channel of each pair.

3. In a control valve system, a plurality of valve units arranged for operative association with a plurality of fluid motor agencies and with a source of fluid power comprising a primary and a secondary valve unit each comprising a pressure open-ended substantially diametric channel, and a free flow open-ended substantially diametric channel, common means for continuously conducting fluid axially into both channels of the primary valve and axially to the pressure channel of said secondary valve, means for normally conducting fluid into the free flow channel of said secondary valve from the free flow channel of the primary valve, means for stopping the free flow as it leaves either valve upon actuation thereof, resulting in the building up of pressure in each of said pressure channels substantially equal to that introduced to said common means from such source of fluid power, said operative association of the fluid motor agencies and said valves being such that the respective agencies are arranged to be actuated respectively by pressure from said pressure channels when appropriate valves are actuated.

4. In a control valve system a plurality of valve units arranged for operating association in groups of from two to more than two, each valve unit having an open-ended substantially diametric pressure outlet channel only through which pressure flow leaves the respective valve unit, and an open-ended substantially diametric free flow outlet channel only through which free flow leaves the respective valve unit, means connecting the pressure channels of all of the valves for constant inter-communication so that pressure in one channel is accompanied by pressure in all, introduced axially into each channel, but which pressure exerts no radial unbalance, means connecting the free flow channels for interruptible communication so that free flow through the free flow channels in series can take place introduced axially into each channel but can be stopped by movement of any valve, means conducting fluid from and to the valve units, and power outlets arranged for selective coupling with one end of the pressure channel of a selected valve and the whole arranged so that no reaction pressure is effective laterally on any valve as the reaction pressure of the fluid in a coupled pressure outlet is balanced by the reaction pressure of the fluid against the valve housing at the opposite end of the coupled outlet.

5. In multiple valve systems a housing, a plurality of valves each independently movable in the housing and having a plurality of channels one of which extends transversely through the valve, a housing having a plurality of conduits respectively establishing communication between one end of each transverse channel of one valve with another channel of another valve, the channels and conduits being so arranged as to establish a free flow circulatory path in series through all of the valves in each of which latter fluid enters the valve and passes axially into said communicating transverse channel to conduct it along said free flow path through the communicating conduit, said flow being interrupted by movement of a selected valve causing the transverse channel therein to disestablish communication with its appropriate housing conduit to close said channel in said valve at each end by the housing, and said valves and their contained channels being each so arranged that when moved to interrupt free flow fluid impinges laterally upon the housing at each end of the transverse channel so as to balance the transverse pressure effective upon the valve.

6. In multiple valve systems a housing, a plurality of valves each independently movable in the housing and having a plurality of channels one of which extends transversely through the valve, a housing having a plurality of conduits respectively establishing communication between one end of each transverse channel of one valve with another channel of another valve, the channels and conduits being so arranged as to establish a free flow circulatory path in series through all of the valves in each of which latter fluid enters the valve and passes axially into said communicating transverse channel to conduct it along said free flow path through the communicating conduit, said flow being interrupted by movement of a selected valve causing the transverse channel therein to disestablish communication with its appropriate housing conduit to close said channel in said valve at each end by the housing, and said valves and their contained channels being each so arranged that when moved to interrupt free flow fluid impinges laterally upon the housing at each end of the transverse channel so as to balance the transverse pressure effective upon the valve, the housing having a port for each valve juxtaposed thereto and communicating with a hydraulic agency, other of said valve channels being in permanent communication with others of said conduits in said housing so as to establish a high pressure line in parallel through all of the valves, each valve having also a high pressure through transverse outlet channel in axial communication with the said permanently communicating channel in said high pressure line in such valve arranged for closing at both ends by the walls of the housing or selectively for communication with its juxtaposed port in said housing at one end and closed by a wall of the housing at the other end as the valve is moved from a position of free flow to a position interrupting same, the arrangement being such that movement of a selected valve to interrupt the flow along the free flow path causes balanced pressures transversely of the valve both from the pressure in the free flow passages and from pressure reaction on the fluid in the selected port by the equal pressure upon the wall of the housing at the other end of said high pressure transverse channel whereby radial balance of the selected valve is secured.

7. In a control valve system, a plurality of valve units, each valve unit comprising a through diametric channel and passage means for introducing pressure axially into said channel, said valves arranged for association in a series, each of adjacent valves being complementally formed so that the respective through diametric channels are staggered or offset out of the same plane, and said passage means for introducing pressure being similarly but oppositely staggered or offset so that each said diametric channel communicates transversely substantially in the same plane with passage means of the adjacent valve so that free flow through all of said passage means and said through diametric channels in said series is secured in a circuitous non-linear path.

8. In multiple valve systems a housing, a plurality of valves each independently movable in the housing and having a plurality of channels one of which extends transversely through the valve, a housing having a plurality of conduits respectively establishing communication between one end of each transverse channel of one valve with another channel of another valve, the channels and conduits being so arranged as to establish a free flow circulatory path in series through all of the valves in each of which latter fluid enters the valve and passes axially into said communicating transverse channel to conduct it along said free flow path through the communicating conduit, said flow being interrupted by movement of a selected valve causing the transverse channel therein to disestablish communication with its appropriate housing conduit to close said channel in said valve at each end by the housing, and said valves and their contained channels being each so arranged that when moved to interrupt free flow fluid impinges laterally upon the housing at each end of the transverse channel so as to balance the transverse pressure effective upon the valve, the housing having a port for each valve juxtaposed thereto and communicating with a hydraulic agency, other of said valve channels being in permanent communication with others of said conduits in said housing so as to establish a high pressure line in parallel through transverse outlet channel in axial communication with the said permanently communicating channel in said high pressure line in such valve arranged for closing at both ends by the walls of the housing or selectively for communication with its juxtaposed port in said housing at one end and closed by a wall of the housing at the other end as the valve is moved from a position of free flow to a position interrupting same, the arrangement being such that movement of a selected valve to interrupt the flow along the free flow path causes balanced pressures transversely of the valve both from the pressure in the free flow passages and from pressure reaction on the fluid in the selected port by the equal pressure upon the wall of the housing at the other end of said high pressure transverse channel whereby radial balance of the selected valve is secured, said high pressure line through the several valve channels and housing conduits being so disposed and arranged that after a selective valve has been actuated to initiate high pressure flow in parallel through all of the valves any other valve can be subsequently actuated to couple its high pressure transverse channel with its appropriate port at one end with the wall of the housing closing the other end to direct a pressure flow through said port without creating lateral unbalance of the last mentioned valve.

GEORGE W. DE BELL.